United States Patent [19]

Alcorn et al.

[11] Patent Number: 5,295,245
[45] Date of Patent: Mar. 15, 1994

[54] DATA ROTATOR FOR ROTATING PIXEL DATA IN THREE DIMENSIONS

[75] Inventors: Byron A. Alcorn, Fort Collins; Robert W. Cherry, Loveland; Mark D. Coleman; Brian D. Rauchfuss, both of Ft. Collins, all of Colo.

[73] Assignee: Hewlett-Packard Company, Palo Alto, Calif.

[21] Appl. No.: 669,801

[22] Filed: Mar. 15, 1991

[51] Int. Cl.[5] .............................................. G06F 15/62
[52] U.S. Cl. .................................... 395/164; 395/133; 395/137; 395/162
[58] Field of Search ..................... 395/133, 136–138, 395/162–166, 119, 121, 123, 127

[56] References Cited

U.S. PATENT DOCUMENTS

5,170,468  12/1992  Shah et al. .................... 395/164 X

Primary Examiner—Gary V. Harkcom
Assistant Examiner—Almis Jankus
Attorney, Agent, or Firm—Guy J. Kelley

[57] ABSTRACT

A three-dimensional pixel cache for use in a computer graphics system comprises source, pattern, and destination tile caches and a barrel shift register, or rotator, that serves as an interface between the tile caches and a frame buffer. The rotator has the capability of performing three types of rotation of data read/written from/to the tile caches horizontal rotation, vertical rotation, and rotation of nibbles within each pixel.

21 Claims, 5 Drawing Sheets

DATA ROTATOR FOR ROTATING PIXEL DATA IN THREE DIMENSIONS

FIELD OF THE INVENTION

The present invention generally relates to shift registers, and more particularly relates to shift registers adapted for use in a computer graphics system. The invention still more particularly relates to a barrel shift register that is capable of rotating pixel data in three dimensions, making it particularly useful in a computer graphics system as an interface between a pixel cache and a frame buffer.

BACKGROUND OF THE INVENTION

The field of computer graphics concerns the creation, storage, manipulation and display of pictures and models of objects by a digital processor. Interactive computer graphics is the subclass of computer graphics in which a user dynamically controls the picture's content, format, size or color on a display surface by means of an interaction device such as a keyboard, lever or joystick. See *Fundamentals of Interactive Computer Graphics*, by J. D. Foley and A. Van Dam, ISBN: 0-201-14468-9. The creation of synthetic images (i.e., images which exist as abstract collections of lines, points, curves, etc., in the computer's memory) is the usual domain of interactive computer graphics.

The two primary classes of interactive computer graphics systems are random-scan and raster-scan systems. Images displayed by a random-scan system are encoded as commands to draw each output primitive (i.e., point, line =2 - 189,364 or polygon) by plotting individual points or drawing connecting lines between specified starting and ending coordinates of line segments. Polygons are simply treated as a closed series of line segments. Encoding for a raster-scan system is much simpler: output primitives are broken into their constituent points for display. The major difference between a simple point-plotting random-scan system and a raster-scan system is in the organization of the stored data used to drive the display. As explained below, the data is stored in a "frame buffer."

In the random-scan system the component points of each output primitive are stored sequentially in memory and plotted in the same order, one point at a time. This is because the beam may be moved randomly on the screen. In the raster-scan system the frame buffer memory is arranged as a 2-dimensional array of data. The value stored at a particular row and column encodes an intensity and/or color value of a corresponding display element on the screen. The location of each display element is typically specified by a unique (X,Y) coordinate. Since each memory location defines a single point-sized element of an image, both the display screen location and its corresponding memory location are often called a "pixel," short for "picture element." Hereinafter, to avoid confusion, the term "display pixel" will be used to indicate picture elements of a display device, and "storage pixel" to indicate memory locations corresponding to the display pixels.

Figure 1:
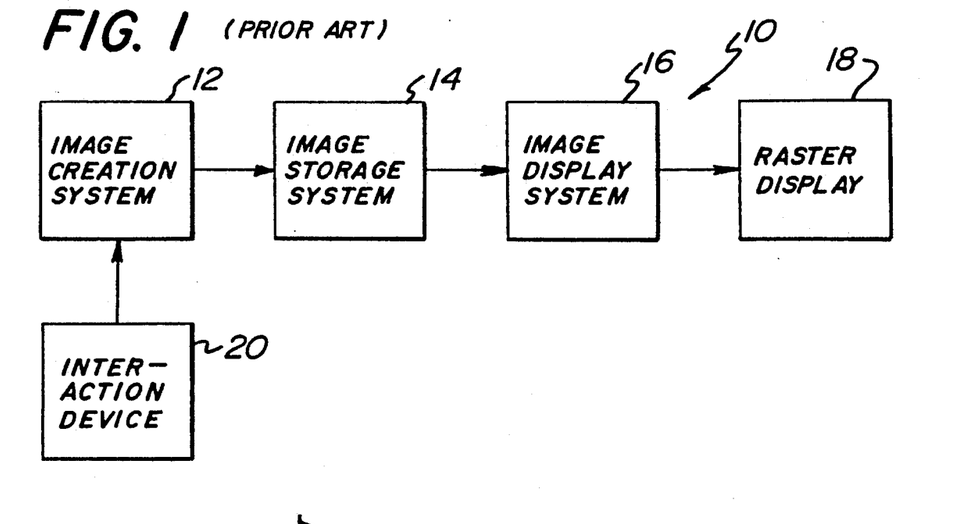
FIG. 1 is a block diagram of a basic raster-scan computer graphics system.

FIG. 1 is a simplified block diagram of a raster-scan graphics system 10 that includes an image creation system 12, an image storage system 14 (which includes a frame buffer), an image display system 16, a raster-scan display 18 and an interaction device 20. The image creation system 12 converts output primitives into pixel data and writes the pixel data to the frame buffer of the image storage system 14. The overall speed at which the stored image data can be modified is dependent upon how fast the image creation system carries out the "scan - 3 =189,364 conversion" process, i.e., the process of converting a mathematical representation of an image to the array of pixel data in the frame buffer. Usually, the faster the scan conversion process is carried out, the faster the overall system response time to user commands. Moreover, it is known that response time is critical to user satisfaction and, more importantly, to user productivity.

A pixel cache comprising one or more cache memory units may be used as an intermediate storage device for pixel data that is to be written to the frame buffer. The pixel cache may also contain circuitry for performing certain operations on the pixel data before the data is written to the frame buffer. The primary goal of the present invention is to provide an interface between a pixel cache and frame buffer that is capable of aligning "tiles" (i.e., data sets representing groups of display pixels or groups of memory locations for storing the data sets) in the cache memory units with the frame buffer's storage pixels. Such aligning is particularly necessary to ensure that an image's appearance does not change when the image creation system is operated in a window-relative mode and the window in which the image is located is horizontally and vertically moved around the screen. In addition, there are advantages in having the capability of rearranging groups of bits (e.g., nibbles) within each byte of pixel data. For example, if only four bits per color are used to represent a pixel value, two different values could be represented per eight-bit byte. Changing the image displayed would be easier and faster if it were possible to easily interchange nibbles within a pixel (which may be thought of as rotating the data in a third dimension).

A further goal of the present invention is to provide a three-dimensional pixel cache that includes means for rotating its data in three dimensions to properly align the cache memory units with the frame buffer. A still further goal of the present invention is to provide a computer graphics system which incorporates a three-dimensional pixel cache that includes means for rotating its data in three dimensions.

SUMMARY OF THE INVENTION

A first embodiment of the invention provides a memory means comprising first input means for reading a first input data set, second input means for reading a second input data set, means for receiving a first control signal and rotating in a first direction the contents of at least one of the first and second input means in response to the first control signal, and means for receiving a second control signal and rotating in a second direction the contents of the first and second input means in response to the second control signal. The contents of the first input means, after being rotated, define a first output data set RA, and the contents of the second input means, after being rotated, define a second output data set RB.

The first input means is most preferably adapted to receive data stored in a tile $T_A$ and the second input means is preferably adapted to receive data stored in a tile $T_B$, wherein each tile represents at least one pixel of an image to be displayed in a computer graphics system.

In the most preferred embodiment, tile $T_A$ comprises data representing four pixels $P0_A$, $P1_A$, $P2_A$, $P3_A$, and tile $T_B$ comprises data representing four pixels $P0_B$, $P1_B$, $P2_B$, $P3_B$. In addition, in the most preferred embodiment the barrel shift register further comprises plane shift means for rotating nibbles in each pixel of the input data sets in response to a third control signal PRSEL; tile select means for selecting, in response to a fourth control signal TILE_SEL, from which of a plurality of tiles the input means are to receive data; cache select means for selecting, in response to a fifth control signal CACHE_SEL, from which of a plurality of caches the input means are to receive data; and means for outputting third and fourth output data sets RC, RD, wherein the first, second, third and fourth output data sets are collectively rotated in response to the first and second control signals.

The data sets in the most preferred embodiment are rotated in response to ROTX and ROTY in accordance with the following table:

| ROTX | ROTY | RA | RB |
|------|------|----|----|
| RX0 | RY0 | $P0_A P1_A P2_A P3_A$ | $P0_B P1_B P2_B P3_B$ |
| RX1 | RY0 | $P1_A P2_A P3_A P0_A$ | $P1_B P2_B P3_B P0_B$ |
| RX2 | RY0 | $P2_A P3_A P0_A P1_A$ | $P2_B P3_B P0_B P1_B$ |
| RX3 | RY0 | $P3_A P0_A P1_A P2_A$ | $P3_B P0_B P1_B P2_B$ |
| RX0 | RY1 | $P0_B P1_B P2_B P3_B$ | $P0_A P1_A P2_A P3_A$ |
| RX1 | RY1 | $P1_B P2_B P3_B P0_B$ | $P1_A P2_A P3_A P0_A$ |
| RX2 | RY1 | $P2_B P3_B P0_B P1_B$ | $P2_A P3_A P0_A P1_A$ |
| RX3 | RY1 | $P3_B P0_B P1_B P2_B$ | $P3_A P0_A P1_A P2_A$ | wherein RX0, RX1, RX2 and RX3 represent four different states of ROTX, and RY0 and RY1 represent two different states of ROTY.

The invention also encompasses a pixel cache for use in a computer graphics system. A cache memory device in accordance with the invention comprises first memory means for storing a first input data set, second memory means for storing a second input data set, and a memory means in accordance with the foregoing description The invention further encompasses a computer graphics system comprising scan converter means for generating pixel data representative of an image to be displayed, frame buffer means for storing the pixel data, and a pixel cache. The pixel cache comprises first tile cache means for storing a first data set representing at least one pixel, second tile cache means for storing a second data set representing at least one pixel, and the memory means described above for interfacing the first and second tile cache means to the frame buffer.

The present invention also encompasses a method for writing data to a memory storage device (e.g., a frame buffer of a computer graphics system) A method in accordance with the invention comprises the following steps: Reading a first data set into a first storage means and reading a second data set into a second storage means; rotating in a first direction at least one of the first and second data sets in response to a first control signal; rotating in a second direction the first and second data sets in response to a second control signal; writing the contents of the first storage means to the memory storage device, the contents defining a first output data set; and writing the contents of the second storage means to the memory storage device, the contents defining a second output data set. The method preferably further comprises the step of rotating nibbles in each byte of the first and second data sets in response to a third control signal PRSEL, the first and second data sets thus having been rotated in "three dimensions."

DESCRIPTION OF THE PREFERRED EMBODIMENT

Figure 2:
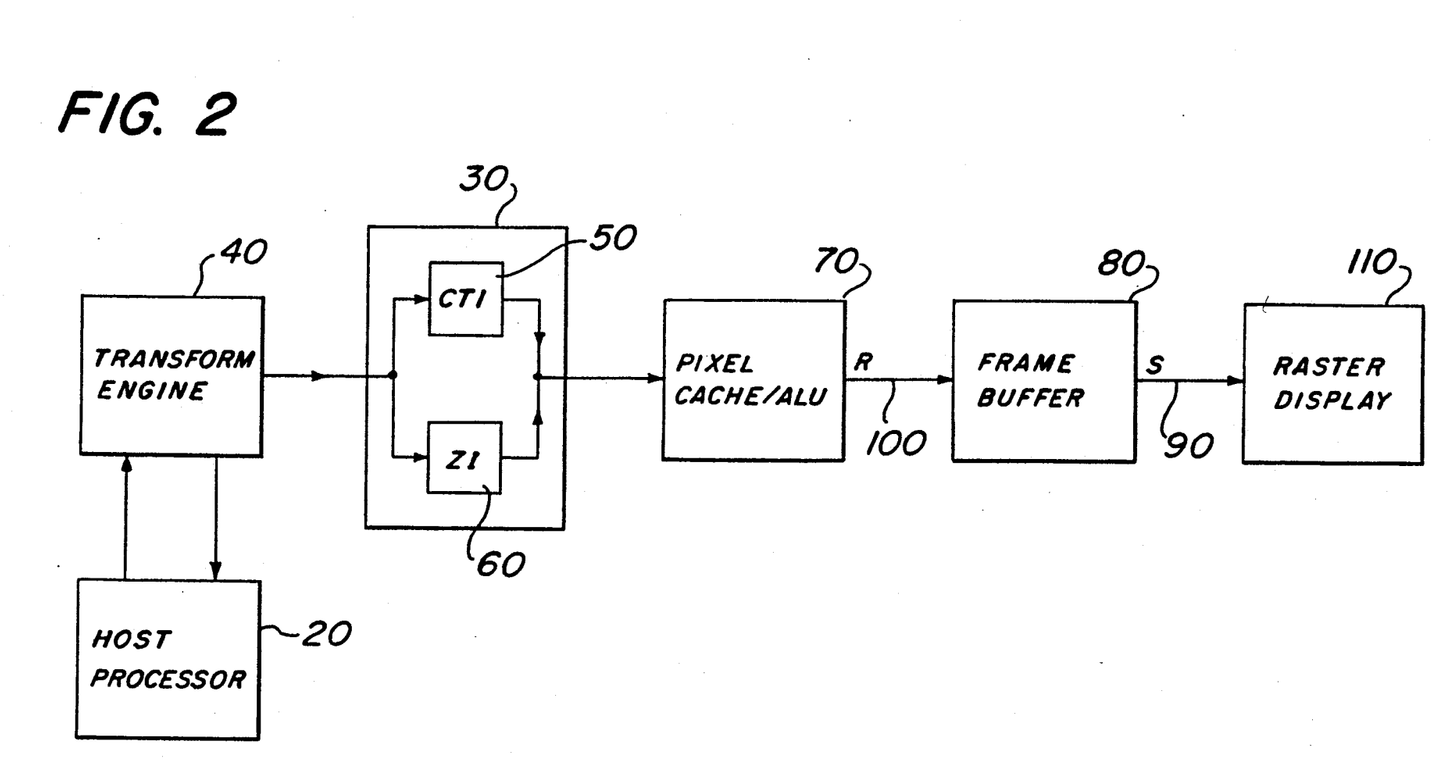
FIG. 2 is a block diagram of a raster-scan computer graphics system in accordance with the present invention.
Figure 3:
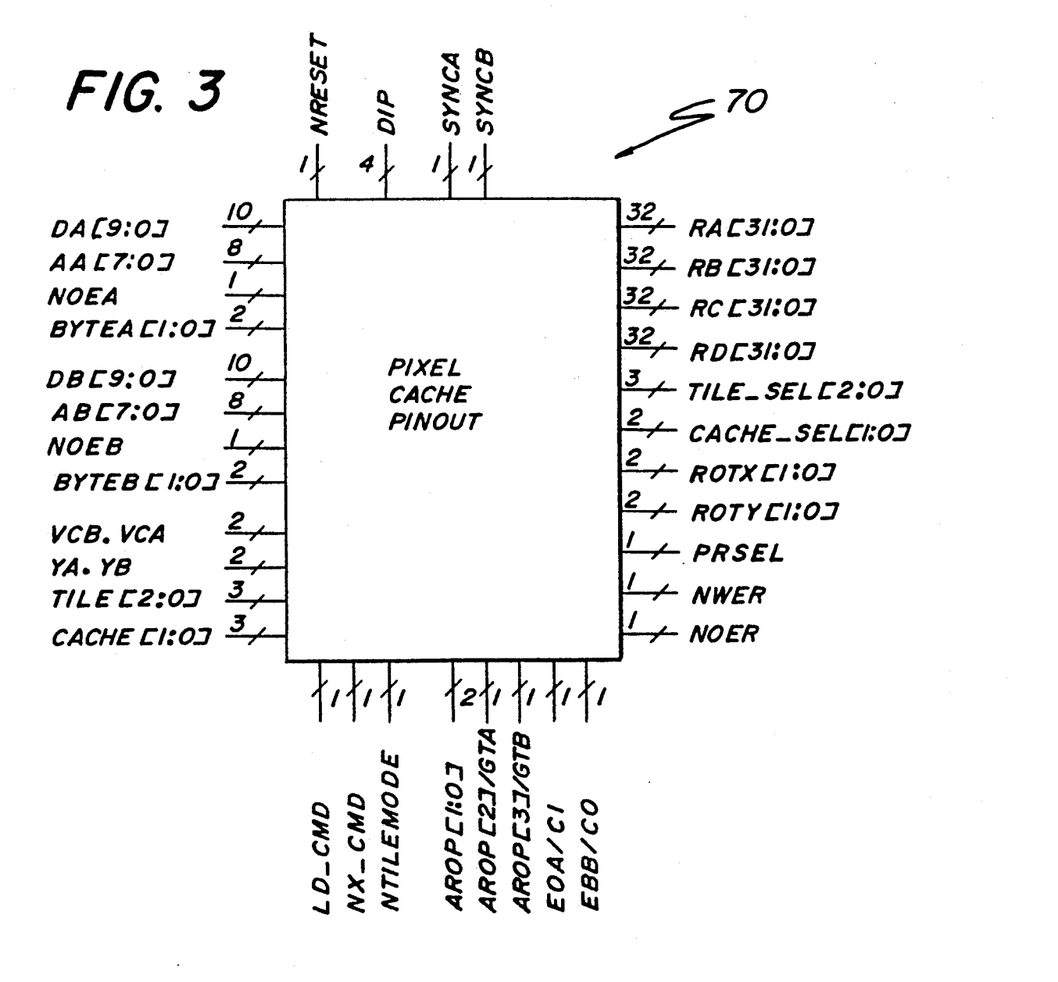
FIG. 3 is a pinout diagram of a pixel cache in accordance with the present invention.

The barrel shift register (or "rotator") 270 (see FIGS. 4 and 5) of the present invention is especially suited to be incorporated into a pixel cache/arithmetic logic processing unit 70 (see FIGS. 2 and 3) of a raster-scan computer graphics system. The pixel cache/ALU (hereinafter "pixel cache") is described in application Ser. No. 495,005, filed Mar. 16, 1990, entitled "Arithmetic and Logic Processing Unit For Computer Graphics System," which is hereby incorporated by reference into the instant application. The capabilities of pixel cache 70 will first be described and then the barrel shift register 270 will be described in terms of its use in the pixel cache. The description of the overall graphics system, depicted in FIG. 2, is provided in the above-referenced application Ser. No. 495,005. This description may be useful in gaining an understanding of the preferred environment of the present invention; however, it is not believed to be essential to gaining an understanding of the present invention and is therefore not repeated herein The pixel cache 70 does much more than just cache pixels sent from the scan converter 30; it combines the pixels in various ways with patterns and pixels already in the frame buffer 80, gamma-corrects the pixels to compensate for characteristics of the raster display 110, and "dithers" the pixels (see copending application Ser. No. 07/670,548, filed Mar. 15, 1991, entitled "Window-relative Dither Circuit," which is hereby incorporated by reference into the instant application) to smooth transitions between intensity levels The pixel cache is also a key element in block moves (see application Ser. No. 494,992, filed Mar. 16, 1990, entitled "Method And Apparatus For Pixel Clipping Source And Destination Windows In A Graphics System"), antialiasing, texture mapping and all other operations involving pixels The pixel cache 70 receives pixels in the following circumstances: When rendering, the pixel cache reads 10-bit or 8-bit color data from the scan converter 30, combines the color data with a pattern, alpha values from the scan converter, and degamma-corrected pixels from the frame buffer 80, gamma-corrects the combination and writes the gamma-corrected pixels back to the frame buffer. This operation is called "blending" new pixels into the frame buffer. During block moves, the pixel cache takes blocks of pixels and moves them to a destination address, combining them on the way with a fixed blending value, a pattern, and pixels already at the destination address.

The pixel cache performs various operations on the pixels it receives from the scan converter 30 and frame buffer 80: As mentioned above, it gamma-corrects pixels sent to the frame buffer and degamma-corrects pixels read from the frame buffer. In addition, sixteen arithmetic operations involving the new pixels, the pixels at the destination address, and either a blending value or a pattern may be performed. After the pixels go through the degamma correction unit, they can be dithered from 8-bits down to 4-bits. Boolean operations between the results of the dither unit, a pattern, and the destination pixels can then be performed. In addition, 8-bit Z values from the scan converter 30 and the frame buffer 80 may be compared, e.g., to remove hidden surfaces. During rendering, pixel cache 70 can compare a fixed window identity ("id") with the window ids in the frame buffer 80 and produce an equal/not-equal output. During block moves, it can compare a source window id with the window ids associated with the source pixels, and compare a destination window id with the window ids associated with the destination pixels An "equal" output signal is generated if both the source and destination ids match. All of these operations can be turned on or off by writing to command registers inside the pixel cache.

Figure 4:
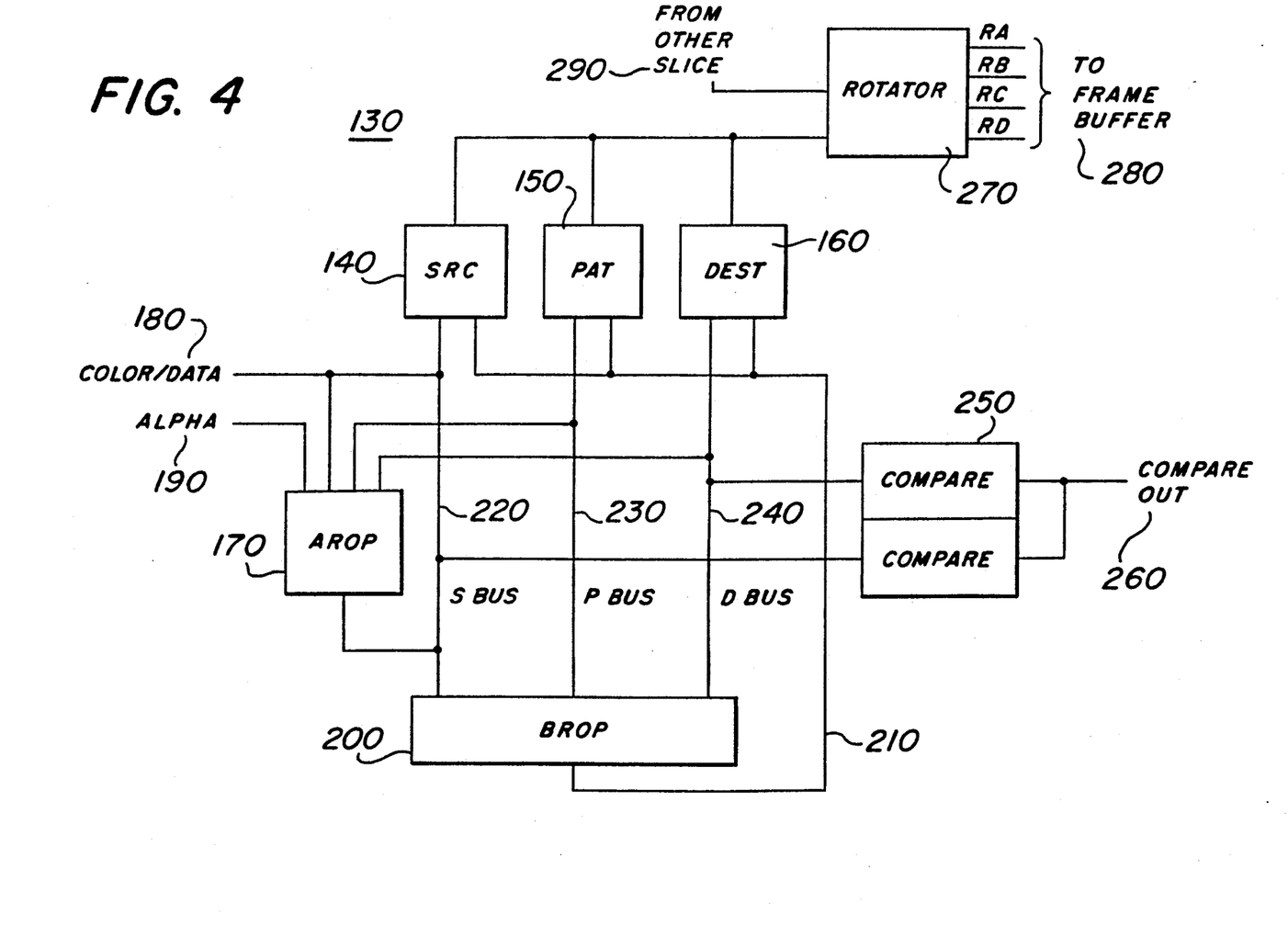
FIG. 4 is a partial block diagram of the pixel cache of FIG. 3.

Referring to FIG. 4, pixel cache 70 comprises two nearly identical processing units referred to as "slices." (Only one slice is depicted in FIG. 4.) Each slice has a Color/Data input port 180 and an Alpha input port 190 and provides one of two inputs to the barrel shift register or rotator 270, which interfaces the slices to the frame buffer 80. Each slice comprises three tile caches 140, 150, 160, 140', 150', 160', an arithmetic raster operation (AROP) unit 170, a Boolean raster operation (BROP) unit 200, a compare circuit 250 and a significant amount of data routing hardware (not shown). The three tile caches of each slice (e.g., tile caches 140, 150, 160) are known as "source," "pattern" and "destination." Each tile cache is composed of eight tiles, where each tile represents four pixels, each of which is eight planes deep (i.e., eight bits deep).

The AROP unit 170 performs a number of operations which involve the tile caches and/or the Color/Data and Alpha input ports. The AROP operates on a single pixel at a time. The BROP unit 200 performs a number of Boolean operations involving the pixels in the tile caches and/or the outputs of the AROP unit. The BROP operates on either one or four pixels (one tile) at a time. The result of the AROP and BROP operations can be written into any of the tile caches, source caches 140, 140' pattern caches 150, 150' or destination caches 160, 160'. The cache written to is controlled by the frame buffer controller (not shown).

There are three types of operations performed by the pixel cache 70: rendering, block moves and compares During rendering operations, a destination tile is first read from the frame buffer 80 into the destination cache(s) 160, 160' and the pixels to be rendered are received from the scan converter 30. The pixels to be rendered are combined with the destination tile, alpha values and/or a pattern and loaded back into the destination cache, from which they are written back to the frame buffer 80. Four pixels are written or read at once. Since the AROP unit 170 only processes one pixel at a time, the destination cache is used as a staging buffer. The pattern to be combined with the pixels can either be stored in the frame buffer and later loaded into the pattern cache(s) 150, 150', or a small pattern can be directly downloaded from the scan converter 30.

During block moves operations, the source cache(s) 140, 140' is (are) filled with 32 pixels (8 tiles×4 pixels/tile). The destination and pattern caches 160, 160', 150, 150' are similarly loaded if they are needed in the operation. Each tile is then processed and written to the destination cache(s). As tiles are stored in the destination cache(s) they are written back to the frame buffer 80 through the barrel shift register 270, which horizontally and vertically aligns them to the correct scan line and pixel.

Window operations occur during both rendering and block moves. During rendering, the id of the window being written to is stored in the destination window id register (not shown; see the above-referenced application Ser. No. 495,005). The window id of the pixel being written to is compared with the number in the destination window id register. The pixel is rendered only if the two ids match. During block moves, the window id of the pixel being read is compared with the number in the source window id register (not shown), and the window id of the pixel to be written is compared with the number in the destination window id register. The pixel is moved only if both comparisons indicate a match. Mask registers (not shown) are used to specify which bits are part of the window id, and can be used to force either the source or the destination compares to always yield equal as a result. See copending application Ser. No. 07/494,992, filed May 6, 1991, now abandoned, in favor of application Ser. No. 07/803,742, now U.S. Pat. No. 5,193,148, entitled "Programmable Depth Window Identity Mask," which is hereby incorporated by reference into the instant application.

FIG. 2 depicts the input/output ports ("pinouts") of the pixel cache 70. The respective uses of these pinouts are briefly described in the following table. The table is followed by a description of the functionality of the pixel cache 70 and barrel shift register 270.

| Pixel Cache Pinouts | |
|---|---|
| DA[9:0] | |
| DB[9:0] | The data ports for the A and B slices. Color, Z, Window, Overlay and Command data is presented on these pins. The 8 MSB's are significant for Z, Window and Command data; for Color and Overlay data there can be either 10 bits or 8 MSB's of color data, corresponding to gamma correction on or off. |
| AA[7:0] | |
| AB[7:0] | The alpha ports for the A and B slices. Alpha information for rendering operations involving AROPs with alpha. |
| RA[31:0] | |
| RB[31:0] | |
| RC[31:0] | |
| RD[31:0] | RAM ports for scan lines A,B,C,D. These ports represent 4 pixels of 8 planes on each of 4 scan lines. Only two ports will be driven at any one time as specified by the ROTY lines. |
| AROP[1:0] | The function for the arithmetic operation (AROP) unit is specified by four bits, these two and the bits shared by the greater than outputs. |
| EQA/CI | |
| EQB/CO | |
| GTA/AROP[2] | |
| GTB/AROP[3] | Compare outputs from the window and Z comparators. The equal to output from slice A (EQA) is also the carry in input (CI) to the two slices; the equal to output from |

Pixel Cache Pinouts (continued)

| | |
|---|---|
| | slice B is the carry out output of the two slices. The carries are activated when the AROP unit is in radiosity mode. The greater than outputs (GTA, GTB) are also the two upper bits of the AROP function; they are used as greater than outputs when the ZCMPEN has been set to indicate Z-compare, otherwise they help specify the AROP function. The GT bit is high when the Z in the frame buffer is greater than the new Z. |
| NOEA | |
| NOEB | Output enables for the DA, DB, AA, and AB ports. These ports drive out when there is a dump ready and the corresponding enable is low. |
| NLD_CMD | This pin, when low, indicates that the Alpha port represents a command and that the command should be loaded into the internal command register. |
| NX_CMD | Indicates that the command in the internal command register should be executed. |
| NVCA | |
| NVCB | Active low Valid Cycle signals for scan lines A, B. NVCA also indicates if NLD_CMD and NX_CMD are valid. |
| CACHE[1:0] | Selects which cache (0=Source, 1=Pattern, 2=Destination, 3=None) the results of the operations on the present pixel will be stored in. |
| TILE[2:0] | Selects which tile (0-7) is dumped to the D, S, and P busses from the caches to the rendering units. |
| BYTEA[1:0] | |
| BYTEB[1:0] | Selects which byte (0-3) of the selected tile is to be modified by the AROP unit and by the BROP unit when tile mode (NTILEMODE) indicates single pixel mode. |
| NTILEMODE | Selects between single pixel and tile mode operation of the BROP circuit. Useful for fast block moves in which full tiles are processed at once. Also used to flag valid bit/pixel transactions. For normal rendering this line should be inactive (high). |
| YA, YB | Address line Y[1] of the window relative pixel address. Used by the dither circuit (see the above-referenced application serial no. 67/670,548 to dither the pixels in a coordinate system relative to the window boundaries. |
| CACHE_SEL[1:0] | Selects which cache (0=Source, 1=Pattern, 2=Destination, 3=Plane Write Enable register) is selected for communication with the frame buffer. |
| TILE_SEL[1:0] | Selects which tile (0-7) will communicate with the frame buffer. |
| NOER | Output enable for the RA, RB, RC, and RD RAM data ports. The pixel cache will drive out to the frame buffer when this line is low. |
| NWER | This pin indicates either a write or read cycle to the pixel cache internal tile caches from the RA, RB, RC, and RD RAM data ports. When it is high, the pixel cache is being read, when it is low, the data on the RAM ports is written to the cache. |
| ROTX[1:0] | Rotator X control. Selects horizontal rotation between RAM ports and the destination register on all scan lines during input or output cycles involving the RAM ports. Is used to align pixels during block moves and window relative rendering. |
| ROTY[1:0] | Rotator Y control. Selects vertical rotation between RAM ports and the destination registers of all scan lines during input or output cycles involving the RAM ports. Is used to align pixels during block moves and window relative rendering. |
| PRSEL | Selects between no swap and a 4-bit swap of each byte on the RAM ports. When set it swaps the nibbles in each of the four bytes as they enter or leave the cache. Used to put the lower buffer into the upper bits for arithmetic operations in 444 double buffer mode. |
| NRESET | All output ports are forced to be high impedance when this pin is low. |
| NSEL | This pad enables the DIP port for accepting commands or data. |
| NSTRB | This is the clock for the DIP port. NDIN is sampled on every other falling edge. |
| NDIN | This DIP pad is the input for shifting commands and scan path data into the chip. |
| NDOUT | The data shifted out of the scan line appears on this port. |
| SYNCA | |
| SYNCB | These are two opposite phase clocks for the pixel cache. The internal clock CK goes high when the voltage on SYNCA is greater than SYNCB; it goes low when SYNCA is less than SYNCB. |

The pixel cache 70 communicates with the frame buffer 80 by way of four identical RAM ports/busses, RA[0:31], RB[0:31], RC[0:31], and RD[0:31]. These busses are coupled to the tile caches via barrel shift register 270, as shown in FIG. 4. Each bus represents 32 frame buffer data lines. Each set of 32 lines is interpreted as eight planes for each of four pixels.

Two control lines are used to control operations at the RAM ports. NOER provides direction control over the four ports; NOER low (true) causes the pads to immediately start driving out if an internal dump signal is true. Two of four internal dump signals will always be true, and are determined by ROTY[0:1]. NWER acts as an active low write enable for the pixel cache 70. NWER low indicates that the pixel cache should write RAM port data to the tile caches; NWER high means that the pixel cache is being read, although the data will not be available on the output of the pixel cache unless NOER is asserted.

In addition to these two control lines, several groups of lines control the addressing and format of the data at the RAM ports. ROTX[0:1] and ROTY[0:1] specify the X and Y rotation of the data at the RAM ports. PRSEL selects between no swapping (when equal to zero) and a nibble swap of each byte on the RAM ports (when equal to one). It shifts the low nibble up and the upper nibble down for both reads from and writes to the pixel cache 70. TILE_SEL[0:2] selects one of eight tiles for the corresponding RAM port cycle. CACHE SEL[0:1] selects one of three sets of tile caches (source 140, 140', pattern 150, 150' or destination 160, 160') or a "plane enable" register (not shown) for the corresponding RAM port cycle. The ROTX and ROTY lines specify a two dimensional rotation of pixels as they are passed between the tile caches and frame buffer. X rotation specifies rotation of pixels "horizontally" within a scan line. Y (or "vertical") rotation specifies rotation of pixels between scan lines. The following tables illustrate each type of rotation.

| | Alignment of each RAM port with tile cache pixels | | | |
|---|---|---|---|---|
| ROTX[0:1] | [31:24] | [23:16] | [15:8] | [7:0] |
| 0 | pixel 0 | pixel 1 | pixel 2 | pixel 3 |
| 1 | pixel 1 | pixel 2 | pixel 3 | pixel 0 |

| | | | | |
|---|---|---|---|---|
| 2 | pixel 2 | pixel 3 | pixel 0 | pixel 1 |
| 3 | pixel 3 | pixel 0 | pixel 1 | pixel 2 |

| | Alignment of each RAM ports with pixel cache slices | | | |
|---|---|---|---|---|
| ROTY[0:1] | RA | RB | RC | RD |
| 0 | slice A | slice B | Z | Z |
| 1 | Z | slice A | slice B | Z |
| 2 | Z | Z | slice A | slice B |
| 3 | slice B | Z | Z | slice A |

X rotation is needed during block moves when the source and destination tiles are not aligned, and during rendering when the data must be window relative. Moreover, if dithering is performed X rotation will be needed so that the dither is window relative; otherwise the dither cell will have to be updated each time a window is moved.

Plane rotation is provided to allow "444 double buffering," which requires placement of pixel data in the lower 4 bits of the 8 planes in the frame buffer, but which also requires that the pixel data be shifted the 4 most significant bits to allow the AROP unit 170 to operate on them. The PRSEL line selects between no shift or a 4 bit nibble swap of the plane data associated with each pixel. The following table illustrates this shift:

| | | Alignment of RAM port bits with pixel cache bits | | | | | | | |
|---|---|---|---|---|---|---|---|---|---|
| PRSEL | Rotation | RA[7] | RA[6] | RA[5] | RA[4] | RA[3] | RA[2] | RA[1] | RA[0] |
| 0 | 0 | bit 7 | bit 6 | bit 5 | bit 4 | bit 3 | bit 2 | bit 1 | bit 0 |
| 1 | 4 | bit 3 | bit 2 | bit 1 | bit 0 | bit 7 | bit 6 | bit 5 | bit 4 |

Note that the same shift applies to all 4 bytes (pixels) on all four RAM ports RA, RB, RC, RD.

The ZERO_LSB register will normally be set when PRSEL is used to zero out the four LSBs of the byte of data going to the AROP unit 170. The nibble merger then puts the 4 LSBs back int the byte when the AROP and BROP units 170, 200 are finished wi it.

As mentioned above, the pixel cache 70 contains 3 tile caches per slice. Each tile cache contains eight tiles of four pixels per tile. Read and write operations on the RAM ports involve one tile in one cache per slice. CACHE_SEL[0:1] selects one of three tile caches to write to the frame buffer 80 or the plane enable register (not shown) in accordance with the following table.

| Cache_SEL[0:1] | Selected Cache |
|---|---|
| 0 | Source |
| 1 | Pattern |
| 2 | Destination |
| 3 | Plane Enable Register |

One of eight tiles within the selected cache is selected with TILE_SEL[0:2]. The same tile cache and the same tile are selected in both slices of the pixel cache 70.

Figure 5:
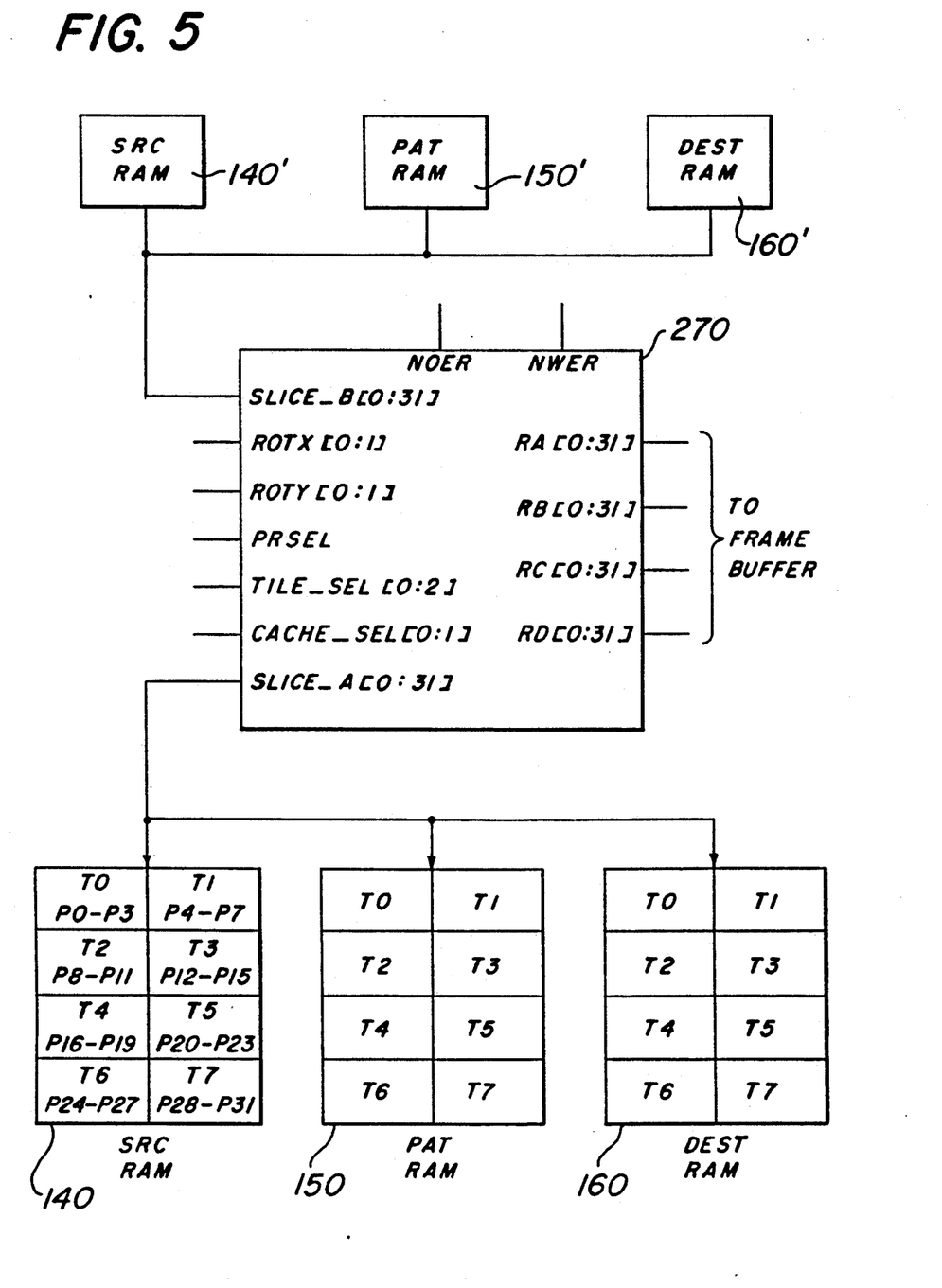
FIG. 5 is a more detailed block diagram of the barrel shift register (or rotator) and tile caches of FIG. 4.

FIG. 5 depicts the barrel shift register 270 serving as an interface between tile caches 140, 150, 160 (corresponding to a first slice ("slice A") of the pixel cache), tile caches 140', 150', 160' (corresponding to a second slice ("slice B")) and the frame buffer (not shown in FIG. 5). Each tile cache stores eight tiles of data T0-T7, with each tile comprising data for four pixels; thus there are 32 pixels P0-P31 stored in each tile cache. Each of the control lines for controlling the barrel shift register 270 is also depicted. A pixel cache in accordance with the foregoing specification is available from the assignee of the instant application, Hewlett Packard Co., Palo Alto, Calif., as part no. IFY7-0001.

Figure 6:
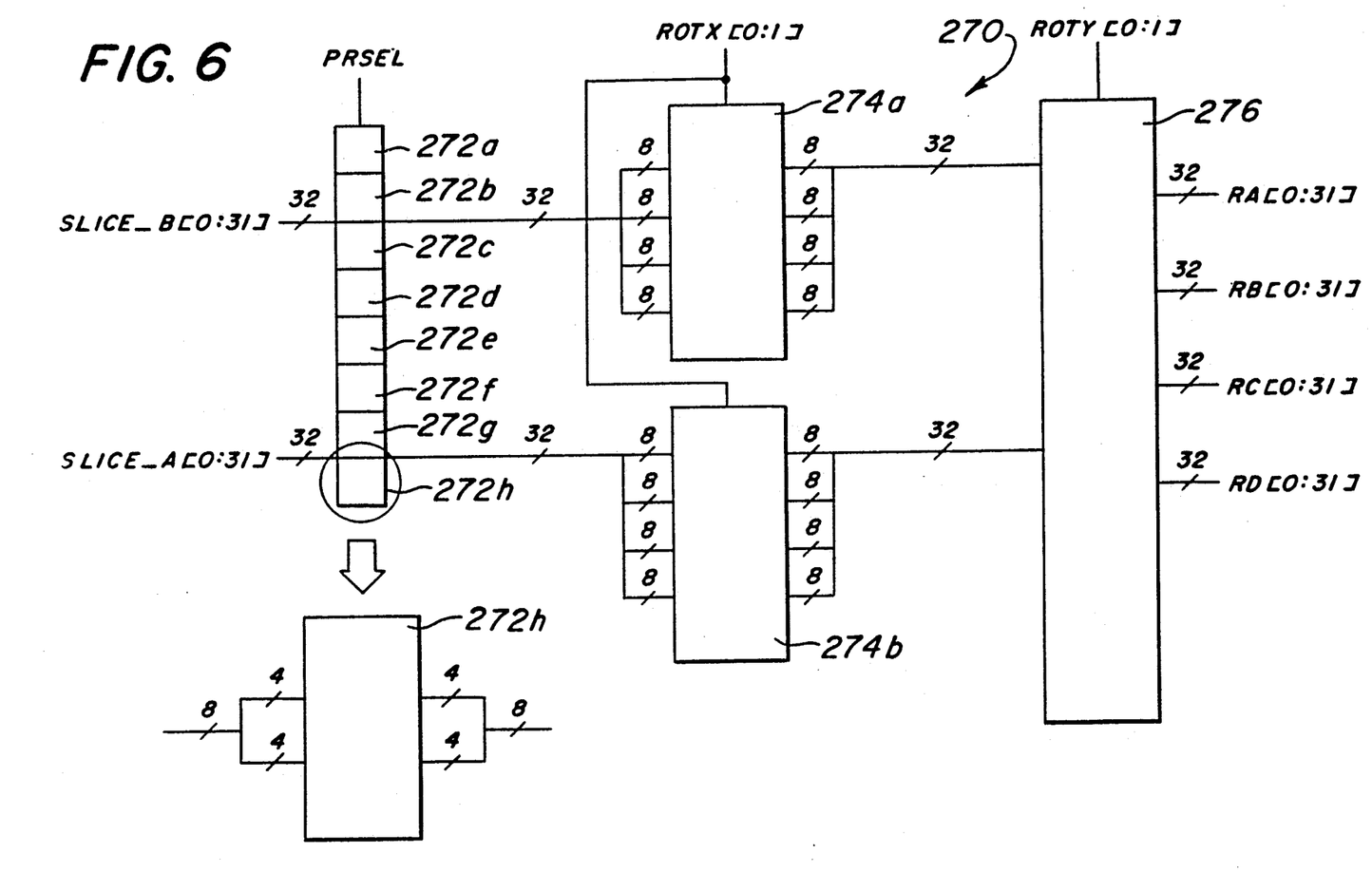
FIG. 6 is a block diagram of a specific embodiment of a barrel shift register in accordance with the present invention.

FIG. 6 is a block diagram of an exemplary embodiment of the barrel shift register 270. This embodiment comprises eight nibble rotators 272a-272h, two four-byte barrel shifters 274a, 274b for horizontal rotation of the pixel data, and a barrel shifter 276 for vertical rotation of the pixel data. The nibble rotators are controlled by PRSEL as described above. Each of the horizontal rotators 274a, 274b is controlled by ROTX[0:1] as described above. The respective 32-bit outputs of rotators 274a and 274b are the inputs to vertical rotator 276, as shown. Two of the four RAM port outputs RA[0:31]-RD[0:31] are driven from the input ports of barrel shifter 276 (the other two outputs are "tristated," i.e., high impedance) in accordance with the ROTY[0:1] control lines, as described above.

In accordance with the foregoing specification of the preferred embodiment, the term "rotation" as defined herein refers to the rearrangement of data such that the final order of the data resembles the result of a cyclic shift; e.g., the term "horizontal rotation" refers to the rearrangement of bits or pixels such that the bit/pixel in the least significant bit/pixel position of a particular unit of data (e.g., a tile) wraps to the most significant bit/- pixel position, or vice versa, depending on the direction of rotation (of course, all bits/pixels in intermediate positions are shifted accordingly, although they do not wrap). "Vertical rotation" is defined as the exchange of entire groups of data, e.g., the exchange of entire tiles between two RAM ports. Finally, it should be noted that the invention is not limited to the specific embodiment described above. For example, it is not necessary that a barrel shift register per se be used to perform the various rotations described, as other memory devices may also be used. Nor is it necessary that the barrel shift register 270 (or other device) be used in the context of a computer graphics system; it could be used as an interface between any two units of memory. Moreover, a barrel shift register need not perform all of the functions described above to be within the true scope of the invention, as set forth in the following claims.

What is claimed is:

1. A memory means, comprising:
   (a) first input means for reading a first input data set;
   (b) second input means for reading a second input data set;
   (c) first rotating means, coupled to said first and second input means, for receiving a first control signal and rotating in a first direction the connects of at least one of said first and second input means in response to said first control signal; and
   (d) second rotating means, coupled to said first and second input means, for receiving a second control signal and rotating in a second direction the contents of said first and second input means in response to said second control signal, the contents of said first input means, after being rotated, defining a first output data set, and the contents of said second input means, after being rotated, defining a second output data set;

wherein said first input means is adapted to read data stored in a first tile $T_A$, said second input means is adapted to read data stored in a second tile $T_B$, each tile representing at least one pixel, said first tile $T_A$ comprises data representing four pixels $P0_A$, $P1_A$, $P2_A$, $P3_A$, and said second tile $T_B$ comprises data representing four pixels $P0_B$, $P1_B$, $P2_B$, $P3_B$; and wherein said first and second rotating means are adapted to rotate said first output data set and second output data set in response to said first control signal and said second control signal in accordance with the following table, wherein RA, RB, ROTX, and ROTY refer to said first output data set, second output data set, first control signal, and second control signal, respectively:

| ROTX | ROTY | RA | RB |
|---|---|---|---|
| RX0 | RY0 | $P0_A\ P1_A\ P2_A\ P3_A$ | $P0_B\ P1_B\ P2_B\ P3_B$ |
| RX1 | RY0 | $P1_A\ P2_A\ P3_A\ P0_A$ | $P1_B\ P2_B\ P3_B\ P0_B$ |
| RX2 | RY0 | $P2_A\ P3_A\ P0_A\ P1_A$ | $P2_B\ P3_B\ P0_B\ P1_B$ |
| RX3 | RY0 | $P3_A\ P0_A\ P1_A\ P2_A$ | $P3_B\ P0_B\ P1_B\ P2_B$ |
| RX0 | RY1 | $P0_B\ P1_B\ P2_B\ P3_B$ | $P0_A\ P1_A\ P2_A\ P3_A$ |
| RX1 | RY1 | $P1_B\ P2_B\ P3_B\ P0_B$ | $P1_A\ P2_A\ P3_A\ P0_A$ |
| RX2 | RY1 | $P2_B\ P3_B\ P0_B\ P1_B$ | $P2_A\ P3_A\ P0_A\ P1_A$ |
| RX3 | RY1 | $P3_B\ P0_B\ P1_B\ P2_B$ | $P3_A\ P0_A\ P1_A\ P2_A$ | wherein RX0, RX1, RX2 and RX3 represents four different states of ROTX, and RY0 and TY1 represent two different states of ROTY.

2. A memory means, comprising:
   (a) first input means for reading a first input data set;
   (b) second input means for reading a second input data set;
   (c) first rotating means, coupled to said first and second input means, for receiving a first control signal and rotating in a first direction the contents of at least one of said first and second input means in response to said first control signal; and
   (d) second rotating means, coupled to said first and second image means, for receiving a second control signal and rotating in a second direction the contents of said first and second input means in response to said second control signal, the contents of said first input means, after being rotated, defining a first output data set, and the contents of said second input means, after being rotated, defining a second output data set;
   wherein said first input means is adapted to read data stored in a first tile $T_A$, said second input means is adapted to read data stored in a second tile $T_B$, each tile representing at least one pixel, said first tile $T_A$ comprises data representing four pixels $P0_A$, $P1_A$, $P2_A$, $P3_A$, and said second tile $T_B$ comprises data representing four pixels $P0_B$, $P1_B$, $P2_B$, $P3_B$; and
   wherein each pixel comprises first and second nibbles, each nibble comprising a group of bits, and further comprising plane shift means for receiving a third control signal PRSEL and rotating nibbles in each pixel of said output data sets in response to said third control signal.

3. A memory means, comprising:
   (a) first input means for reading a first input data set;
   (b) second input means for reading a second input data set;
   (c) first rotating means, coupled to said first and second input means, for receiving a first control signal and rotating in a first direction the contents of at least one of said first and second input means in response to said first control signal; and
   (d) second rotating means, coupled to said first and second input means, for receiving a second control signal and rotating in a second direction the contents of said first and second input means in response to said second control signal, the contents of said first input means, after being rotated, defining a first output data set, and the contents of said second input means, after being rotated, defining a second output data set;
   wherein said first input means is adapted to read data stored in a first tile $T_A$, said second input means is adapted to read data stored in a second tile $T_B$, each tile representing at least one pixel;
   wherein at least one of said input means is further adapted to read data stored in at least one additional tile, and further comprising tile select means for receiving a fourth control signal TILE_SEL and selecting, in response to said fourth control signal, from which of said tiles said at least one input means is to read data.

4. A memory means, comprising:
   (a) first input means for reading a first input data set;
   (b) second input means for reading a second input data set;
   (c) first rotating means, coupled to said first and second input means, for receiving a first control signal and rotating in a first direction the contents of at least one of said first and second input means in response to said first control signal; and
   (d) second rotating means, coupled to said first and second input means, for receiving a second control signal and rotating in a second direction the contents of said first and second input means in response to said second control signal, the contents of said first input means, after being rotated, defining a first output data set, and the contents of said second input means, after being rotated, defining a second output data set;
   wherein said first input means is adapted to read data stored in a first tile $T_A$, said second input means is adapted to read data stored in a second tile $T_B$, each tile representing at least one pixel;
   wherein at least one of said input means is coupled to a plurality of caches, and further comprising cache select means for selecting, in response to a fifth control signal CACHE_SEL from which of said plurality of caches said at least one input means in to read data.

5. A memory means, comprising:
   (a) first input means for reading a first input data set;
   (b) second input means for reading a second input data set;
   (c) first rotating means, coupled to said first and second input means, for receiving a first control signal and rotating in a first direction the connects of at least one of said first and second input means in response to said first control signal;
   (d) second rotating means, coupled to said first and second input means, for receiving a second control signal and rotating in a second direction the consponse to said second control signal, the contents of said first input means, after being rotated, defining a first output data set, and the contents of said second input means, after being rotated, defining a second output data set; and means, coupled to said first and second input means, for outputting a third output data set RC and a fourth output data set RD, said first and second rotating means further comprising means for rotating said third and fourth output data sets in response to said first and second control signals.

6. A cache memory device, comprising:
(a) first memory means for storing a first input data set;
(b) second memory means for storing a second input data set; and
(c) a memory means, comprising:
  (i) first input means for reading said first input data set;
  (ii) second input means for reading said second input data set;
  (iii) first rotating means, coupled to said first and second input means, for receiving a first control signal and rotating in a first direction the contents of at least one of said first and second input means in response to said first control signal; and
  (iv) second rotating means, coupled to said first and second input means, for receiving a second control signal and rotating in a second direction the contents of said first and second input means in response to said second control signal, the contents of said first input means, after being rotated, defining a first output data set, and the contents of said second input means, after being rotated, defining a second output data set;

wherein said first tile $T_A$ stores data representing a group of pixels and said second tile $T_B$ stores data representing a group of pixels, each pixel comprising first and second nibbles, each nibble comprising a group of bits, and further comprising plane shift means for rotating nibbles in each pixel of said output data sets in response to a third control signal PRSEL.

7. The cache memory device recited in claim 6, wherein said first memory means comprises a first tile $T_A$ and said second memory means comprises a second tile $T_B$, each tile representing at least one pixel.

8. The cache memory device recited in claim 7, wherein said first tile $T_A$ stores data representing four pixels $P0_A$, $P1_A$, $P2_A$, $P3_A$, and said second tile $T_B$ stores data representing four pixels $P0_B$, $P1_B$, $P2_B$, $P3_B$.

9. The cache memory device recited in claim 8, wherein said first and second rotating means are adapted to rotate said first output data set and second output data set in response to said first control signal and said second control signal in accordance with the following table, wherein RA, RB, ROTX, and ROTY refer to said first output data set, second output data set, first control signal, and second control signal, respectively:

| ROTX | ROTY | RA | RB |
|---|---|---|---|
| RX0 | RY0 | $P0_A P1_A P2_A P3_A$ | $P0_B P1_B P2_B P3_B$ |
| RX1 | RY0 | $P1_A P2_A P3_A P0_A$ | $P1_B P2_B P3_B P0_B$ |
| RX2 | RY0 | $P2_A P3_A P0_A P1_A$ | $P2_B P3_B P0_B P1_B$ |
| RX3 | RY0 | $P3_A P0_A P1_A P2_A$ | $P3_B P0_B P1_B P2_B$ |
| RX0 | RY1 | $P0_B P1_B P2_B P3_B$ | $P0_A P1_A P2_A P3_A$ |
| RX1 | RY1 | $P1_B P2_B P3_B P0_B$ | $P1_A P2_A P3_A P0_A$ |
| RX2 | RY1 | $P2_B P3_B P0_B P1_B$ | $P2_A P3_A P0_A P1_A$ |
| RX3 | RY1 | $P3_B P0_B P1_B P2_B$ | $P3_A P0_A P1_A P2_A$ | wherein RX0, RX1, RX2 and RX3 represent four different states of ROTX, and RY0 and RY1 represent two different states of ROTY.

10. The cache memory device recited in claim 7, wherein at least one of said memory means further comprises at least one additional tile, and further comprising tile select means for receiving a fourth control signal TILE_SEL and selecting, in response to said fourth control signal, to read data from said additional tile.

11. The cache memory device recited in claim 7, further comprising:
third memory means, coupled to said first input means, for storing said first input data set; and
cache select means for selecting, in response to a fifth control signal CACHE_SEL, from which of said first and third memory means said first input means is to receive data.

12. The cache memory device recited in claim 6, further comprising:
means, coupled to said first and second input means, for outputting a third output data set RC and a fourth output output data set RD, said first and second rotating means further comprising means for rotating said third and fourth output data sets in response to said first and second control signals.

13. A computer graphics system, comprising:
(a) scan converter means for generating pixel data representative of an image to be displayed;
(b) frame buffer means for storing said pixel data; and
(c) a pixel cache, comprising:
  (i) first tile cache means, coupled to said scan converter means, for storing a first data set representing at least one pixel;
  (ii) second tile cache means, coupled to said scan converter means, for storing a second data set representing at least one pixel; and
  (iii) memory means for interfacing said first and second tile cache means to said frame buffer,
first input means for reading said first data set from said first tile cache means;
second input means for reading said second data set from said second tile cache means;
first output means for writing a first selected arrangement of said first and second data sets to said frame buffer, said first selected arrangement defining a third data set;
second output means for writing a second selected arrangement of said first and second data sets to said frame buffer, said second selected arrangement defining a fourth data set;
horizontal rotation means for horizontally rotating said third and fourth data sets in response to a first control signal; and
vertical rotation means for vertically rotating said third and fourth data sets in response to a second control signal.

14. The computer graphics system recited in claim 13, wherein said first tile cache means comprises a first tile $T_A$ and said second tile cache means comprises a second tile $T_B$, each tile representing at least one pixel.

15. The computer graphics system recited in claim 14, wherein said first tile $T_A$ stores data representing four pixels $P0_A$, $P1_A$, $P2_A$, $P3_A$, and said second tile $T_B$ stores data representing four pixels $P0_B$, $P1_B$, $P2_B$, $P3_B$.

16. The computer graphics system recited in claim 15, wherein said third data set and fourth data set are rotated in response to said first control signal and said second control signal in accordance with the following table, wherein RA, RB, ROTX, and ROTY refer to said first output data set, second output data set, first control signal, and second control signal, respectively:

| ROTX | ROTY | RA | RB |
|------|------|----|----|
| RX0 | RY0 | $P0_A\,P1_A\,P2_A\,P3_A$ | $P0_B\,P1_B\,P2_B\,P3_B$ |
| RX1 | RY0 | $P1_A\,P2_A\,P3_A\,P0_A$ | $P1_B\,P2_B\,P3_B\,P0_B$ |
| RX2 | RY0 | $P2_A\,P3_A\,P0_A\,P1_A$ | $P2_B\,P3_B\,P0_B\,P1_B$ |
| RX3 | RY0 | $P3_A\,P0_A\,P1_A\,P2_A$ | $P3_B\,P0_B\,P1_B\,P2_B$ |
| RX0 | RY1 | $P0_B\,P1_B\,P2_B\,P3_B$ | $P0_A\,P1_A\,P2_A\,P3_A$ |
| RX1 | RY1 | $P1_B\,P2_B\,P3_B\,P0_B$ | $P1_A\,P2_A\,P3_A\,P0_A$ |
| RX2 | RY1 | $P2_B\,P3_B\,P0_B\,P1_B$ | $P2_A\,P3_A\,P0_A\,P1_A$ |
| RX3 | RY1 | $P3_B\,P0_B\,P1_B\,P2_B$ | $P3_A\,P0_A\,P1_A\,P2_A$ | wherein RX0, RX1, RX2 and RX3 represent four different states of ROTX, and RY0 and RY1 represent two different states of ROTY.

17. The computer graphics system recited in claim 14, wherein at least one of said memory means further comprises at least one additional tile, and further comprising tile select means for selecting, in response to a fourth control signal TILE_SEL, from which of said tiles said memory means is to receive data.

18. The computer graphics system recited in claim 13, wherein each pixel comprises first and second nibbles, each nibble comprising a group of bits, and further comprising plane shift means for rotating nibbles in each pixel of said third and fourth data sets in response to a third control signal PRSEL.

19. The computer graphics system recited in claim 13, further comprising:

third memory means, coupled to said first input means, for storing said first data set; and cache select means for selecting, in response to a fifth control signal CACHE_SEL, from which of said first and third memory means said first input means is to receive data.

20. The computer graphics system recited in claim 13, further comprising:

third output means for outputting a third selected arrangement of said first and second data sets, said third selected arrangement defining a fifth data set RC; and fourth output means for outputting a fourth selected arrangement of said first and second data sets, said fourth selected arrangement defining a sixth data set RD, wherein said third, fourth, fifth and sixth data sets are rotated in response to said first and second control signals.

21. A method for writing data to a memory storage device, comprising the steps of:

(a) reading a first data set into a first storage means and reading a second data set into a second storage means;

(b) rotating in a first direction the contents of at least one of said first and second storage means in response to a first control signal; and (c) rotating in a second direction said first and second storage means in response to a second control signal;

(d) writing the contents of said first storage means to said memory storage device, said contents defining a first output data set;

(e) writing the contents of said second storage means to said memory storage device, said contents defining a second output data set; and (f) rotating nibbles in each byte of said first and second data sets in response to a third control signal PRSEL, each nibble comprising a group of bits.

* * * * *

UNITED STATES PATENT AND TRADEMARK OFFICE
CERTIFICATE OF CORRECTION

PATENT NO. : 5,295,245
DATED : March 15, 1994
INVENTOR(S) : Byron A. Alcorn, et al.

It is certified that error appears in the above-identified patent and that said Letters Patent is hereby corrected as shown below:

In claim 1, column 10, line 61, delete "connects" and insert therefor --contents--.
In claim 1, column 11, line 33, delete "TY1" and insert therefor --RY1--.
In claim 2, column 11, line 45, delete "image" and insert therefor --input--.
In claim 4, column 12, line 53, after "CACHE_SEL" insert --,--.
In claim 4, column 12, line 54, delete "in" and insert therefor --is--.
In claim 13, column 14, line 46, after "buffer," insert --comprising--.

Signed and Sealed this

Twenty-sixth Day of May, 1998

*Attest:*

BRUCE LEHMAN

*Attesting Officer*  *Commissioner of Patents and Trademarks*